(12) United States Patent
Jayasuriya et al.

(10) Patent No.: US 10,093,262 B2
(45) Date of Patent: Oct. 9, 2018

(54) SEATBELT PAYOUT MEASURING DEVICE AND SYSTEM

(71) Applicant: Ford Global Technologies, LLC, Dearborn, MI (US)

(72) Inventors: Mangala A. Jayasuriya, Bloomfield Hills, MI (US); Mark A. Cuddihy, New Boston, MI (US); Mark Allan Lippman, New Baltimore, MI (US); Manoharprasad K. Rao, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 336 days.

(21) Appl. No.: 14/674,227

(22) Filed: Mar. 31, 2015

(65) Prior Publication Data

US 2016/0288766 A1    Oct. 6, 2016

(51) Int. Cl.
*B60R 22/00* (2006.01)
*B60R 21/015* (2006.01)

(52) U.S. Cl.
CPC .............................. *B60R 21/01548* (2014.10)

(58) Field of Classification Search
CPC ................................................ B60R 21/01548
See application file for complete search history.

(56) References Cited

U.S. PATENT DOCUMENTS

| 6,213,510 | B1  |   | 4/2001 | Suyama  |              |
|-----------|-----|---|--------|---------|--------------|
| 6,572,148 | B2  |   | 6/2003 | Wittenberg |           |
| 7,644,798 | B2  |   | 1/2010 | Lenning |              |
| 2006/0171127 | A1 | * | 8/2006 | Kadoya | B29C 45/14377 |
|  |  |  |  |  | 361/752 |
| 2007/0109111 | A1 | * | 5/2007 | Breed | B60N 2/2863 |
|  |  |  |  |  | 340/435 |
| 2008/0229820 | A1 | * | 9/2008 | Naydenov | G01F 23/266 |
|  |  |  |  |  | 73/304 C |
| 2012/0018989 | A1 |  | 1/2012 | Breed |  |
| 2015/0127224 | A1 | * | 5/2015 | Tabe | B60R 22/48 |
|  |  |  |  |  | 701/45 |
| 2016/0244020 | A1 | * | 8/2016 | Umakoshi | B60R 22/46 |

FOREIGN PATENT DOCUMENTS

DE    2005002866    7/2006
JP    10287202    10/1998

* cited by examiner

*Primary Examiner* — Adam M Alharbi
(74) *Attorney, Agent, or Firm* — Frank A. MacKenzie; Bejin Bieneman PLC

(57) ABSTRACT

A seatbelt payout measuring device with a rewind spring having a first end connected to a center spool and a second end connected to a rewind spring housing. A dielectric material layered immediately adjacent to the rewind spring forming a first layer and an electrolytic coil with dielectric material layered on both sides forming a second layer, isolating the rewind spring from the electrolytic coil. A capacitive measuring device having a first lead connected to the first end of the rewind spring and a second lead connected to a first end of the electrolytic coil. The capacitive measuring device measuring capacitance with belt pullout.

16 Claims, 11 Drawing Sheets

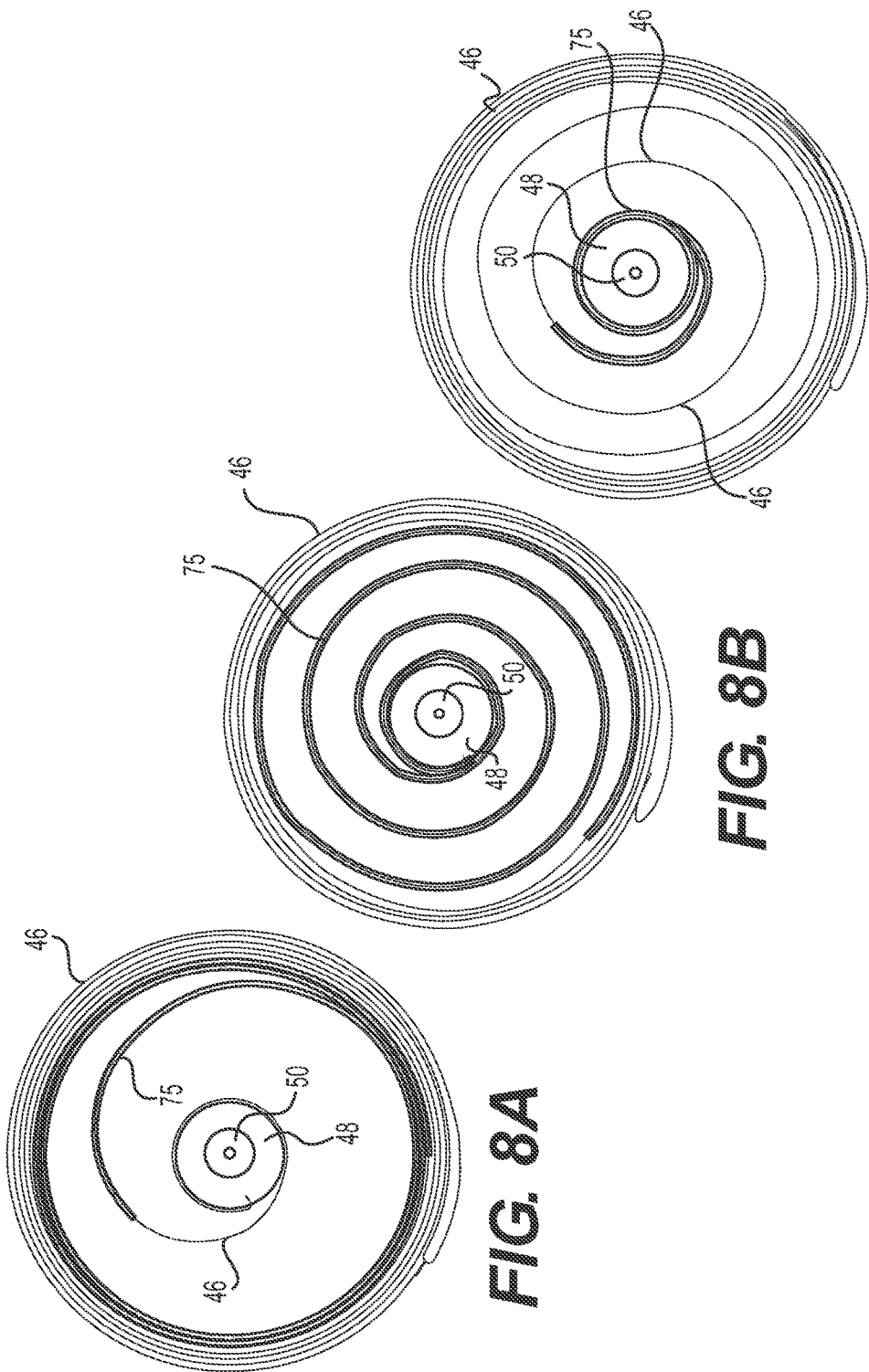

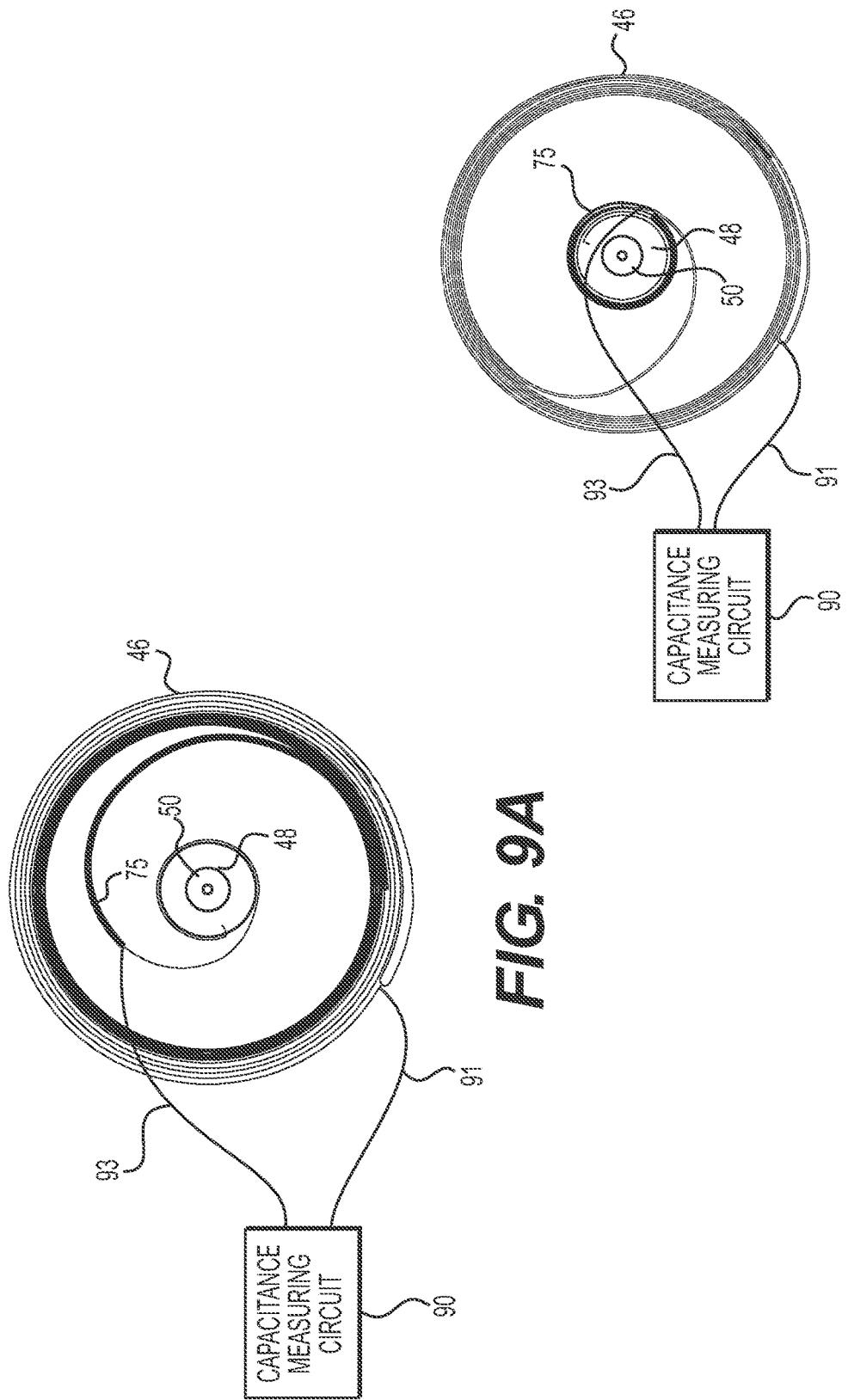

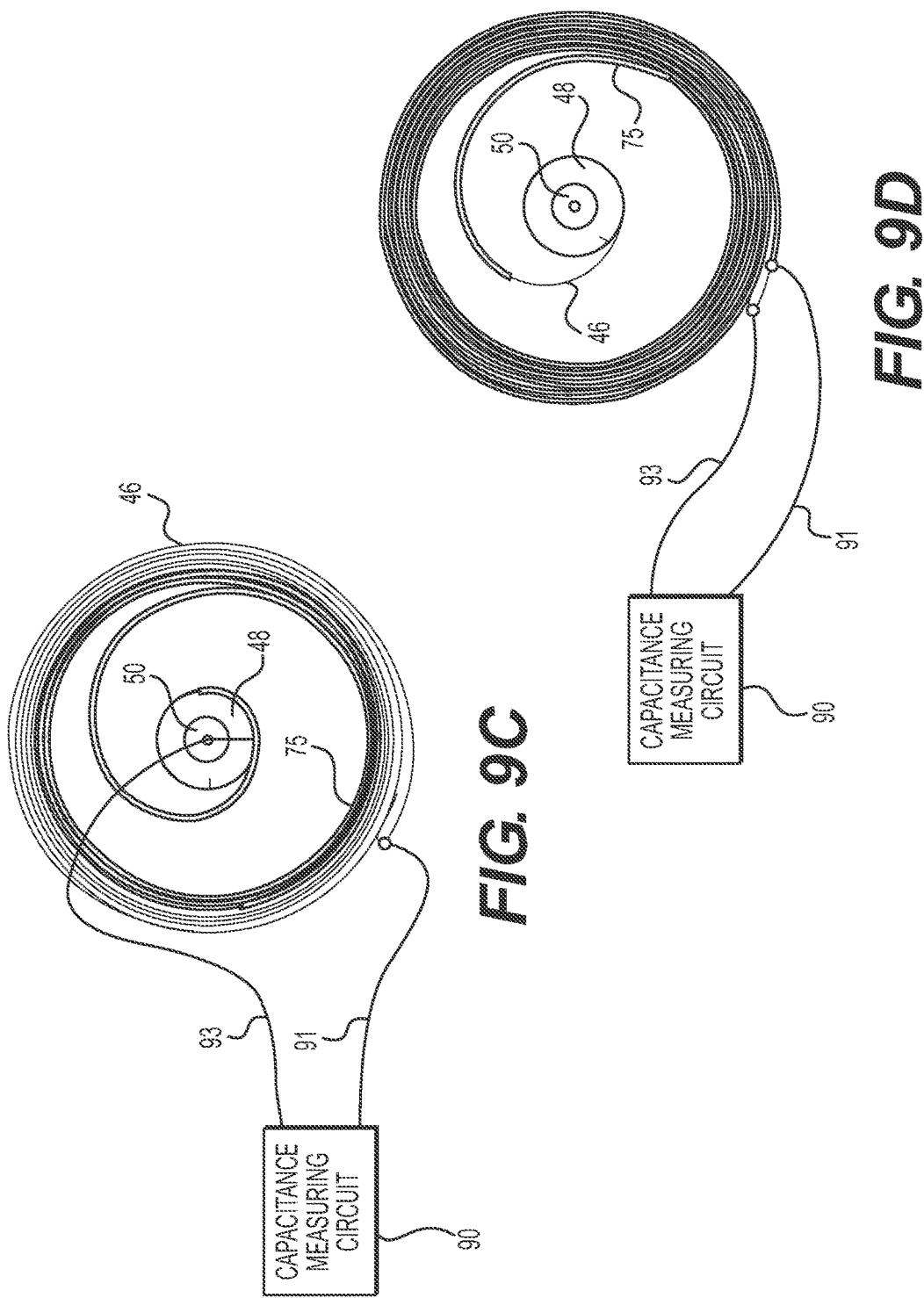

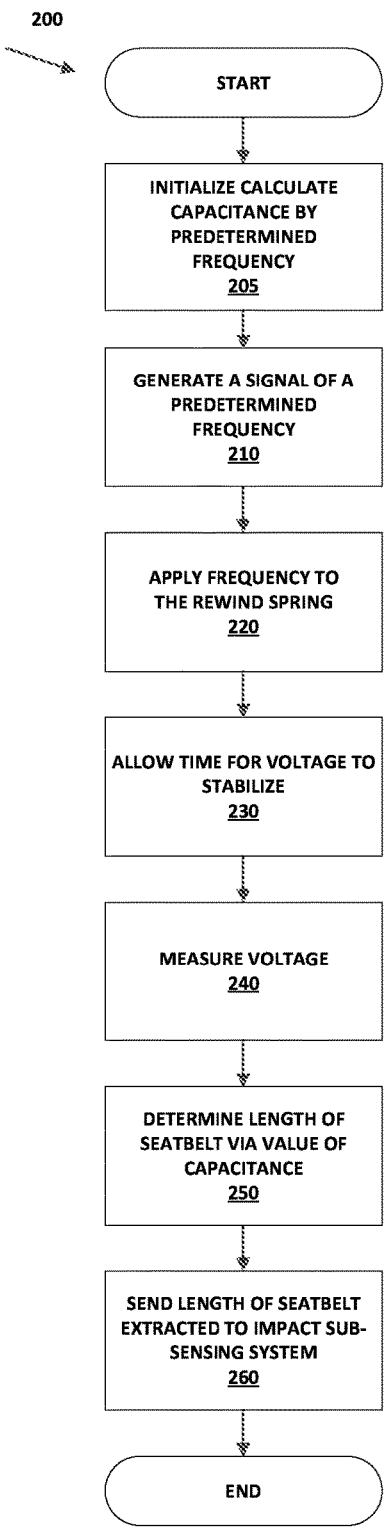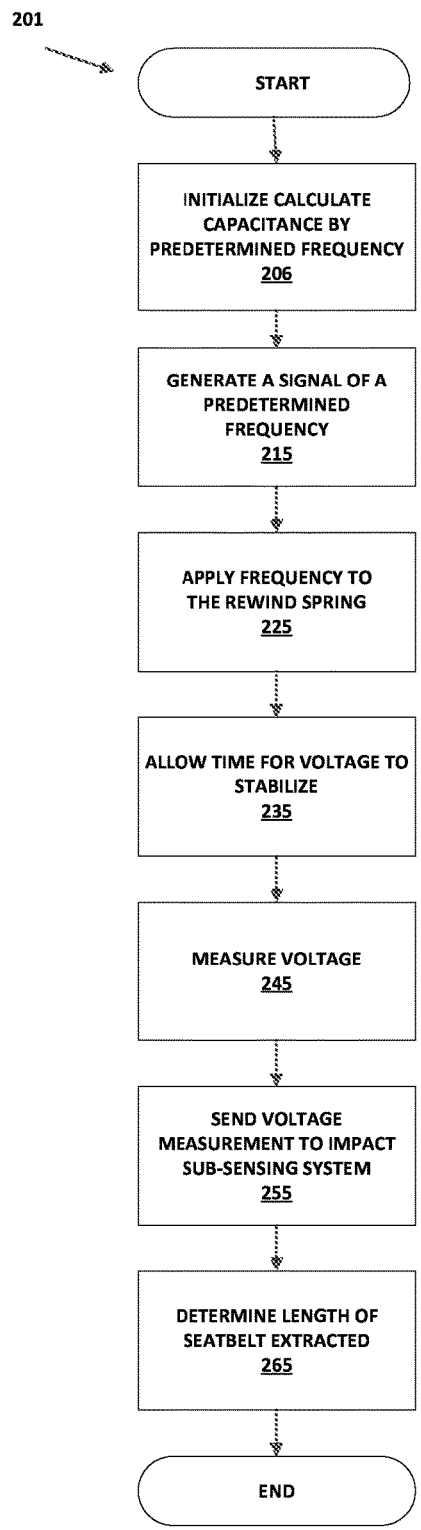
FIG. 11A　　　　　　FIG. 11B

US 10,093,262 B2

SEATBELT PAYOUT MEASURING DEVICE AND SYSTEM

BACKGROUND OF THE INVENTION

Occupant size is one of the key metrics in vehicle design to accommodate various sizes and shapes of human beings comfortably and safely. The occupants riding in an automobile are protected by various advanced technology and safety systems. These may include various advanced airbags, seatbelt systems with sensor based pre-tensioning and load limiting capabilities, etc. Safety systems such as airbags and seatbelts are typically optimized for the size of the occupant and his or her seating position. For example, some of these systems can be adjusted electronically or using pyrotechnics to provide optimum protection during a crash based on the size of the occupant.

Current occupant size identification methods include use of weight sensors, seat track position, and visual identifications. Further methods include measuring the radius of webbing on a retractor spool, connecting string potentiometers to the webbing, mounting various types of belt location sensors on the webbing and using cameras, etc. All of these methods require additional parts mounted outside the retractor. Furthermore, these measuring devices add weight, increase costs, and require extra package space to mount them within a vehicle.

BRIEF DESCRIPTION OF THE DRAWINGS

FIG. 8A is a perspective view of an example of the capacitive sensor when a small sized person is buckled up.

FIG. 8B is a perspective view of an example of the capacitive sensor when a medium sized person is buckled up.

FIG. 8C is a perspective view of an example of the capacitive sensor when a large sized person is buckled up.

FIG. 9A is a perspective view of an example of the capacitive sensor and capacitor measuring electronics of an unwound seatbelt spring retractor.

FIG. 9B is a perspective view of an example of the capacitive sensor and capacitor measuring electronics of an wound seatbelt spring retractor.

FIG. 9C is a perspective view of an example of the capacitive sensor and capacitor measuring electronics with a first measuring lead connected to the axis of rotation and a second test lead connected to an outer end of the rewind spring.

FIG. 9D is a perspective view of an example of the capacitive sensor and capacitor measuring electronics with a first measuring lead connected to an outer end of the rewind spring and a second measuring lead connected to the outer end of the second coil.

FIG. 11A is a flowchart of a capacitive measurement technique using a predetermined frequency.

FIG. 11B is a flowchart of a capacitive measurement technique using a predetermined frequency in a controller.

DETAILED DESCRIPTION

The disclosed subject matter is described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

A seated occupant in a vehicle should be offered of some free movement of the upper torso within a vehicle compartment, but this movement should be limited in the event of a crash. Most modern seat belts are stowed on spring-loaded reels called "retractors," equipped with inertial locking mechanisms that stop the belt from extending, or paying out from the reel during a severe deceleration, e.g., during a crash event. The retractor cinches the seatbelt in an event of an impact.

Disclosed herein are systems and methods to determine an approximate size of a vehicle occupant. Based on such determination, an amount and/or type of safety measures to deploy in the event of a crash or a rapid deceleration may also be determined.

Figure 1:
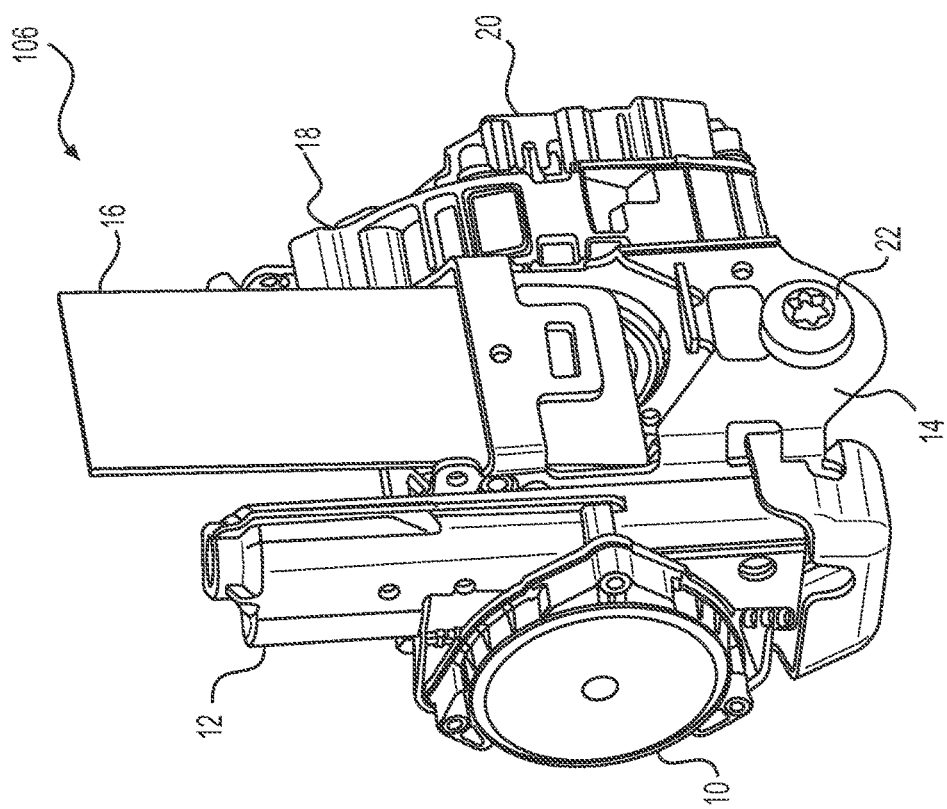
FIG. 1 is a perspective view of an exemplary pyrotechnic pretensioner seatbelt retractor mechanism.

With reference to the Figures, wherein like numerals indicate like parts throughout the several views, FIG. 1 illustrates exemplary components of a pyrotechnic pretensioner seatbelt retractor 100. A rewind spring housing 10 is adjacent to, e.g., mounted on and/or abutting, a pyrotechnic pre-tensioner 12 which is adjacent to, e.g., mounted on and/or abutting, a first side of the seatbelt housing 14. Retractable seatbelt webbing 16 is retained within the housing 14. A pyrotechnic torqueing unit 18 such as is known, is also attached or mounted to a second side of the seatbelt housing 14. An inertial seatbelt latch lock compartment 20 and a mounting bolt 22, such as are also known, are also illustrated. The pyrotechnic pre-tensioner 12 is engaged in the event of an impact to "snug up" the occupant wearing the seatbelt.

Figure 2:
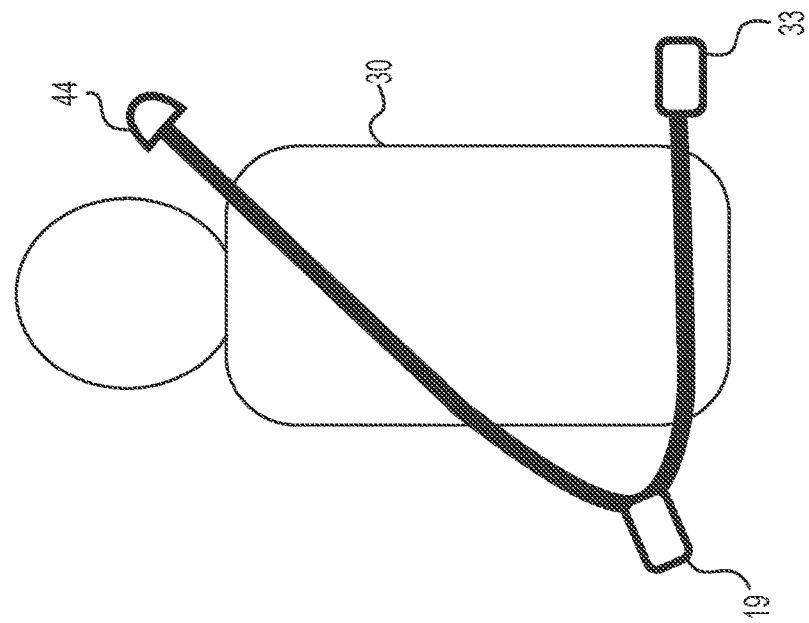
FIG. 2 shows an example of an anthropomorphic test device (ATD) that simulates the dimensions, weight proportions and articulation of the human body in a three point seatbelt.
Figure 3B:
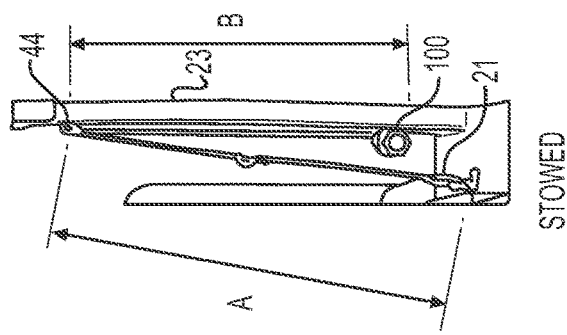
FIG. 3B illustrates how the seatbelt of FIG. 3A appears when it is stowed.
Figure 3A:
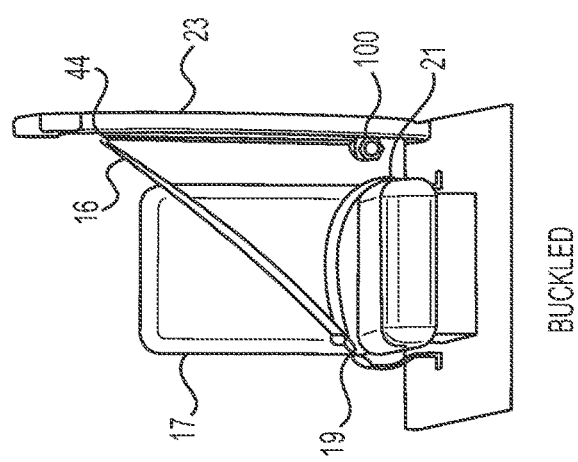
FIG. 3A illustrates how an exemplary seatbelt appears when it is buckled.

An amount of seatbelt webbing 16 payout varies typically according to factors such as a seat position and a size of a seat occupant. FIG. 2 shows an exemplary anthropomorphic test device (ATD) 30, such as is known, and placement of the seatbelt webbing 16. A first end of the seatbelt webbing 16 is attached to a first hard point 33 proximate to a left hip of the ATD 30. The seatbelt webbing 16 traverses across a lap portion of the ATD 30 into a buckle 19 and continues across a midsection of the ATD 30 through a D-ring 44, and finally to the seatbelt retractor 100 (not shown). The retractor 100 can be affixed to a vehicle frame 23 as seen in FIGS. 3A and 3B, to a vehicle floor, or any other rigid point.

A length of the seatbelt webbing 16 that is required to secure a vehicle occupant as represented by the ATD 30 varies with the size and body habitus of the ATD 30. Table 1 illustrates exemplary lengths of seatbelt webbing 16 deployed in millimeters (mm) to securely hold the ATD 30 for various occupant sizes. Specifically, the table illustrates deployed lengths of webbing 16 for three different body types by a percentile of the general population of adults in the United States ranked by body size, and that of a hypothetical average 6 year old. As can be seen, a deployed length of the webbing 16 can vary as much as 550 mm due to differing sizes of occupants.

TABLE 1

| ATD Size | Belt length (mm) |
|---|---|
| 6 Year Old | 670 |
| 5$^{th}$ Percentile of Population | 900 |
| 50$^{th}$ Percentile of Population | 1070 |
| 95$^{th}$ Percentile of Population | 1220 |

FIG. 3B shows an example of the seatbelt in a stowed position. A typical total length of a seatbelt webbing 16 in an embodiment is approximately 3300 mm. A length of webbing from the seatbelt retractor 100 to an anchor through D-ring 44 varies from vehicle to vehicle. Typically, the amount of seatbelt webbing 16 wound on a spool (not shown) which is mounted on a center spool shaft 48 of the seatbelt retractor 100 is about 1300 mm or more when the seatbelt is in stowed position.

Figure 4:
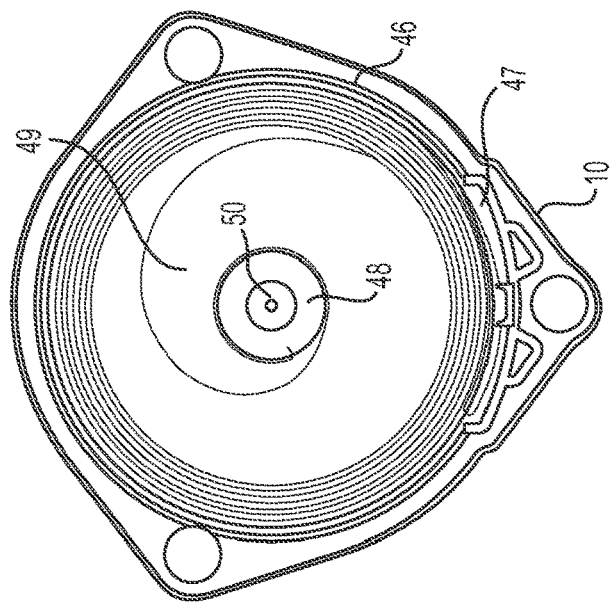
FIG. 4 is a perspective view of an exemplary rewind spring when a seatbelt is stowed.

FIG. 4 illustrates an exemplary rewind spring 46 when the seatbelt webbing 16 is stowed. The rewind spring 46 is arranged to pull excess seatbelt webbing 16 onto the center spool 48. A first end of the rewind spring 46 is connected to a center shaft 48 which rotates about the axis 50 of the center spool shaft 48, and a second end of the rewind spring 46 is secured to a tab at outer periphery of the rewind spring housing 10 as can be seen in the FIG. 4. The spring winds in the space between the outer periphery and the center spool shaft 48.

Figure 5C:
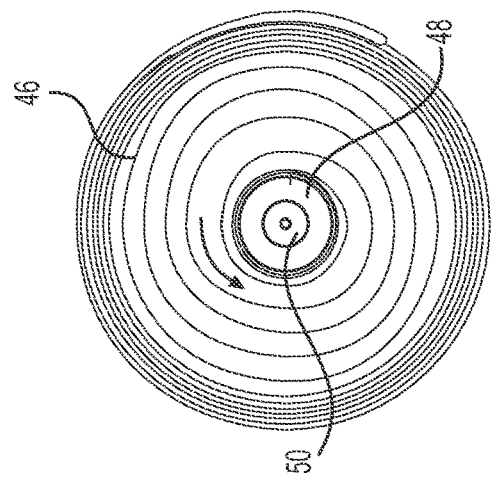
FIG. 5C is a perspective view of the rewind spring of FIG. 4 during further deployment of a seatbelt payout device.
Figure 5B:
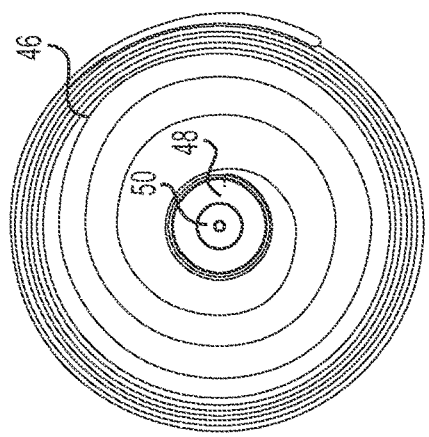
FIG. 5B is a perspective view of the rewind spring of FIG. 4 during initial deployment of the seatbelt payout device.
Figure 5A:
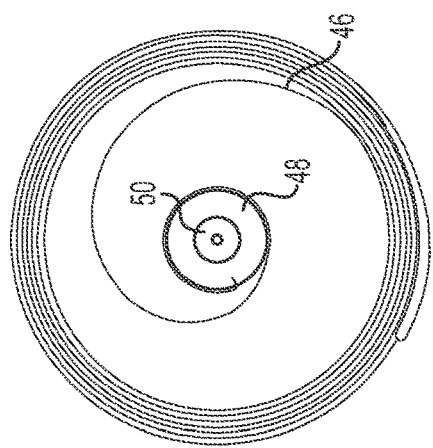
FIG. 5A is a perspective view of the rewind spring of FIG. 4 before movement (i.e., in a stowed state) of a seatbelt payout device.

The rewind spring 46 is somewhat under tension (torsion) when the seatbelt webbing 16 is stowed, as shown in FIG. 5A. FIG. 5B shows the rewind spring 46 increased its tension as the seatbelt webbing 16 is pulled out of the retractor 100. The rewind spring 46 begins to wind towards the center spool 48. FIG. 5C further illustrates tensioning and winding of the rewind spring 46 about the center spool 48 as the seatbelt webbing 16 is extracted or paid out even further.

Figure 6:
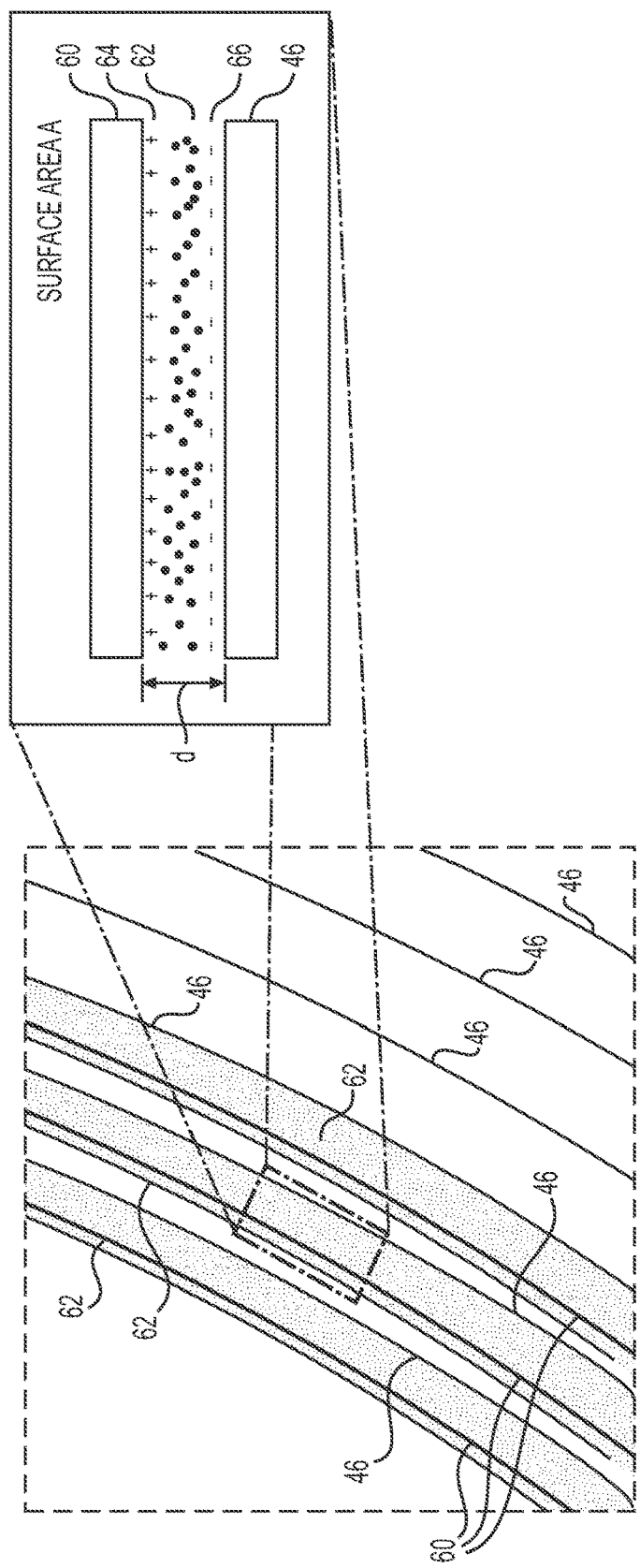
FIG. 6 is a perspective view of a portion of the rewind spring of FIG. 4 showing layering of the rewind spring and a second coil that forms a capacitive payout sensor.
Figure 7A:
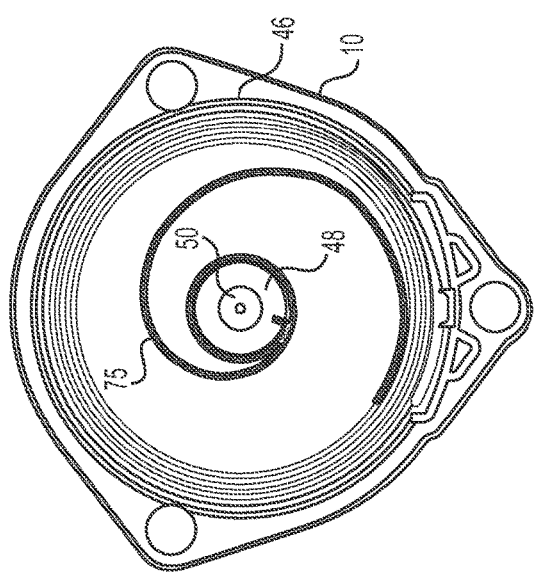
FIG. 7A is a perspective view of an exemplary spring of a retractor including the capacitive sensor in a rewind spring housing.
Figure 7B:
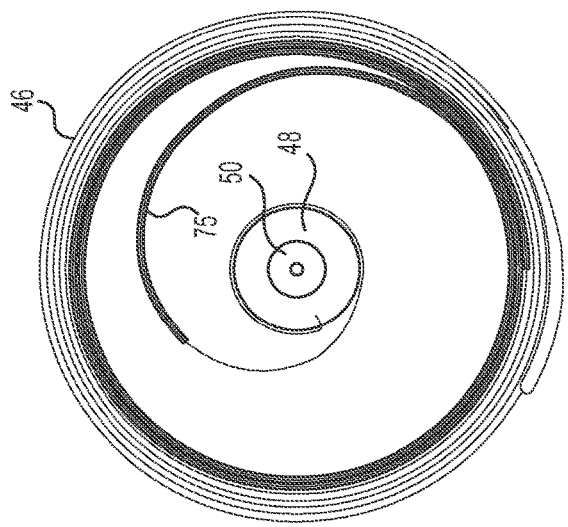
FIG. 7B is a perspective view of the spring of a retractor of FIG. 7A with the capacitive sensor before the seatbelt is pulled out of the seatbelt housing.

Now referring to FIGS. 6, 7A, and 7B, to determine a length of the seatbelt webbing 16 extracted from the seatbelt retractor 100, an electrolytic flexible coil 60 is layered adjacent to a dielectric material 62, which is an electrical isolation barrier. The dielectric material 62 is attached to the rewind spring 46 to form a flexible parallel plate capacitor 75. A capacitor is a two-terminal electrical component used to store energy electrostatically in an electric field and contains two electrical conductor plates, e.g., the rewind spring 46 and the electrolytic coil 60 separated by an insulator, e.g., the dielectric material 62. FIG. 6 shows a view of the rewind spring 46, the electrolytic coil 60 and the dielectric material 62. The potential charges on the plates of the flexible parallel plate capacitor 75 are also illustrated as positive charges 64, and the negative charges 66 are shown in FIG. 6 to illustrate that the rewind spring 46 and the electrolytic coil 60 form the plates of a capacitor. The polarity of the charge may be switched based on the polarity of the power source used to measure the capacitance.

When the seatbelt 16 is in a stowed state (see FIG. 4), the flexible parallel plate capacitor 75 will have a particular capacitance value that is measured by the capacitance measuring device 90. As the seatbelt webbing 16 is pulled out (i.e., paid out) of the seatbelt housing 14, the rewind spring 46 and the electrolytic coil 60 begin to coil around center spool shaft 48. Because the shape of the rewind spring 46 and the electrolytic coil 60 change as the seatbelt webbing is paid out, a capacitance value changes as the webbing is paid out. Advantageously, this capacitance value can be used to determine a length of seatbelt webbing 16 that is pulled (i.e., paid) out.

Methods for measuring capacitance are known and any one of several approaches may be incorporated in the device 90 to measure capacitance between the spring 46 and the electrolytic coil 60, such as an oscillator circuit or a time-charge circuit. Further known are integrated circuits, such as a system on a chip (SOC), that have been developed for measuring capacitance with high precision. SOCs are small and inexpensive, and can easily be integrated into the rewind spring housing 10 with minimal effect on overall package size.

The SOC is an integrated circuit (IC) that integrates all components of a computer system into a single chip substrate, including a processor, a memory for storing instructions and registers for executing processor instructions. SOCs are useful because they can accommodate digital inputs and outputs (I/O) signals, analog I/O signals and mixed-signal I/O, and can provide various communication port types, e.g., controller area network (CAN), Ethernet or Inter-Integrated Circuit (I$^2$C), all on a single chip. SoCs are very common in embedded systems and mobile electronics because of their size and their low power consumption. Alternatively the capacitance can be measured by a device connected to the spring 46 and electrolytic coil 60 outside the retractor.

As discussed above, the electrolytic coil 60 should be electrically isolated from the rewind spring 46. Therefore, a pliable dielectric material 62, as also mentioned above, is placed between the rewind spring 46 and the electrolytic coil 60. Because the rewind spring 46 and the insulated electrolytic coil 60 will be sliding against each other as the seatbelt is pulled out and retracted, it is also important that this material have a low frictional coefficient. Materials such as Teflon, Mylar, polyvinyl chloride (PVC), polypropylene (PP), polyethylene naphthalate (PEN), polyethylene terephthalate (PET) or other similar material can be used as the pliable dielectric material 62. The term frictional coefficient is well known, and is a dimensionless scalar value which describes the ratio of the normal force to the frictional force between two bodies and the force pressing them together.

The electrolytic coil 60 can be of the same material and thickness as the rewind spring 46, which is usually a spring steel or a spring steel alloy. Alternatively, the electrolytic coil 60 can be aluminum, copper or any malleable metal electrical conductor. In alternative embodiments, the electrolytic coil 60 can be a metallic-like material, a metalized thin foil, or a metalized film on dielectric plastic, and can be of differing lengths and widths. The width of the conductive (electrolytic) coil 60 is equal or smaller than the width of the spring 46 and can affect the capacitance of the capacitor 75 by changing the area adjacent to the rewind spring. A wider coil will produce a capacitor with higher capacitance. It may or may not affect the mechanical properties of the spring, based on the selected material and flexibility of the electrolytic coil 60 and with a wider coil it may increase the spring constant of the spring. The length of the coil determines the portion of the belt pay out which is monitored by the capacitor. The coil can be lengthened or shortened in order to monitor only the portions of the webbing payout that are of interest.

In yet another embodiment, the layer of dielectric material 62 and the electrolytic coil 60 are combined into a single dielectric-electrolytic layer and is attached to the rewind spring 46 to form the flexible parallel plate capacitor 75.

FIG. 7A illustrates a location of the flexible parallel plate capacitor 75 within the rewind spring housing 10, while FIG. 7B shows a position of the flexible parallel plate capacitor 75 when not wound about the center spool shaft 48 and when a majority of the flexible parallel plate capacitor 75 is nearer the outer periphery 47 of the rewind spring housing 10 as opposed to the center spool shaft 48.

As stated above, a shape of the flexible parallel plate capacitor 75 varies with a size of a seat occupant. For example, the flexible parallel plate capacitor 75 is generally not wound or wound shorter length of the capacitor about the center spool shaft 48 when a smaller sized person is buckled up, as shown in FIG. 8A. The flexible parallel plate capacitor 75 generally has increased length wound about the center spool shaft 48 when a medium sized person is buckled up, as shown in FIG. 8B. Furthermore, as additional webbing 16 is pulled out of the seatbelt housing 14 for a larger sized person, the flexible parallel plate capacitor 75 generally has further increased length wound or would be fully wound onto the center spool 48, as illustrated in FIG. 8C. In general the parallel plate capacitor comes closer to the spool center shaft 60 as the seatbelt pulls out.

With reference to FIGS. 9A-9D, to measure the capacitance of the parallel plate capacitor 75 in the illustrated embodiment, a first lead 91 of a capacitive measurement device 90 is attached to the rewind spring 46 and a second lead 93 of the capacitive measurement device 90 device to the electrolytic coil 60. The second lead 93 on the electrolytic coil 60 must be free to move inside the rewind spring housing 10 to accommodate the motion of the spring as it coils around the center shaft. FIG. 9A shows the capacitive measurement device 90 connected to an unwound rewind spring 46, while FIG. 9B shows the capacitive measurement device 90 connected to a wound rewind spring 46.

The electrolytic coil 60 can be positioned anywhere on the rewind spring 46. For example, FIG. 9C shows the rewind spring 46 and the electrolytic coil 60 approximate the center spool shaft 48 as opposed to the spring housing 10, and the capacitive measurement device 90 having one measuring lead 93 connected to the axis of rotation of the center spool shaft 48, which is electrically connected to the electrolytic coil 60, and the other lead 91 connected to an outer end of the rewind spring 46.

In another embodiment (see FIG. 9D), the capacitive measurement device 90 first lead 91 is connected to the electrolytic coil 60, and the second lead 93 is connected to the rewind spring 46 and the flexible parallel plate capacitor 75 is positioned near the outer periphery area 47 of the rewind spring housing 10 as opposed to an inner periphery area 49 nearer the center spool shaft 48. Additionally, it will be understood that respective attachment points of the leads 91 and, 93 of the capacitive measurement device 90 can vary depending upon technology used and also upon packaging and spatial considerations.

Figure 10:
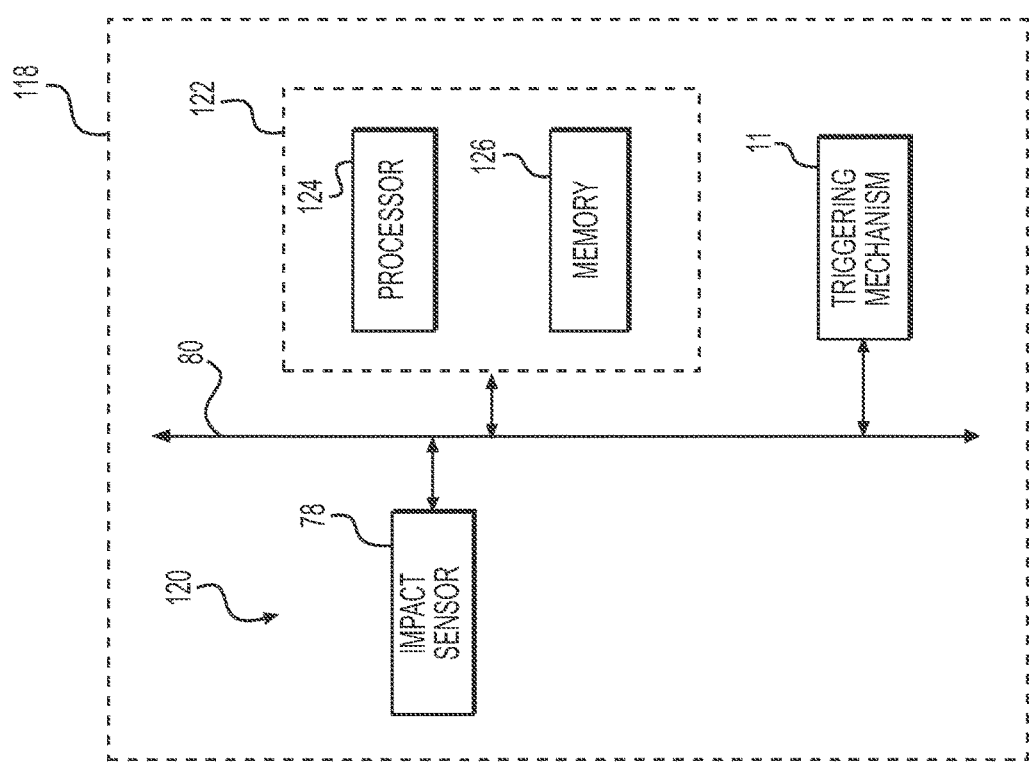
FIG. 10 is a block diagram of an control sub-system for the passenger protection system.

The seatbelt retractor 100 may include an impact sensing sub-system 118, as stated above, and as illustrated in FIG. 10. The controller 122 of the impact sensing sub-system 118 generally includes a processor 124 and a memory 126. The memory 126 stores instructions executable by the processor 124 to identify an impact or crash event of a vehicle, e.g., in a known manner. The controller 122 is generally further programmed, upon identifying the impact, to cause triggering of the triggering mechanism 11, moving the passenger protection system or the seatbelt retractor 100 from the undeployed state to the deployed state and engaging the pyrotechnic pre-tensioner 12 via an instruction from the triggering mechanism 11.

An impact sensor 78 such as is known is typically in communication with the controller 122 to communicate data to the controller 122. The impact sensor 78 may be of any suitable type, e.g., using accelerometers, radar, lidar, and/or a vision system. The vision system may include one or more cameras, CCD image sensors, and/or CMOS image sensors, etc. Based on data communicated by the impact sensor 78, the controller 122 may cause triggering the triggering mechanism 11.

Communications between the controller 122, the impact sensor 128, the triggering mechanism 11, and or other components in the vehicle 110, may be conducted via a communication bus 80, such as a controller area network (CAN) bus, of a vehicle. The controller 122 may use information from the communication bus 80 to control the triggering of the triggering mechanism 11. The triggering mechanism 11 may be connected to the controller 122 or may be connected to the communication bus 80, as shown in FIG. 10.

In an embodiment, the capacitance value obtained from the capacitor 75 can be sent to an impact sensing sub-system 118 (see FIG. 10) for use in calculating whether to engage the pyrotechnic pre-tensioner 12 in the event of a crash or sudden deceleration. FIG. 11A is a flowchart illustrating an exemplary process 200 to evaluate the capacitance of the flexible parallel plate capacitor 75 by determining an unknown capacitance with a predetermined frequency 205. A signal of a predetermined frequency is generated in a block 210 and applied in a block to the rewind spring 46 and the electrolytic coil 60 in a block 220. After a predetermined time period, the voltage on the flexible parallel plate capacitor 75 stabilizes in a block 230. The predetermined time period is selected using the predetermined frequency and an estimate of the capacitance value. A voltage measurement is then taken 240 in a block and the length of the seatbelt webbing paid out is calculated in a block 250. The length information is sent to the impact sensing sub-system 118 in a block 260.

In an alternative embodiment, the voltage measurement can be sent directly to the to the impact sensing sub-system 118. FIG. 11B is a flowchart illustrating an exemplary process 201 to evaluate the capacitance of the flexible parallel plate capacitor 75 by determining an unknown capacitance with a predetermined frequency 206. A signal of a predetermined frequency is generated in a block 215 and applied in a block to the rewind spring 46 and the electrolytic coil 60 in a block 225. After a predetermined time period, the voltage on the flexible parallel plate capacitor 75 stabilizes in a block 235. The predetermined time period is selected using the predetermined frequency and an estimate of the capacitance value. A voltage measurement is then taken 245 and is sent to the impact sensing sub-system 118 in a block 255 and the impact sensing sub-system calculates the length of the seatbelt extracted in a block 265.

Figure 12A:
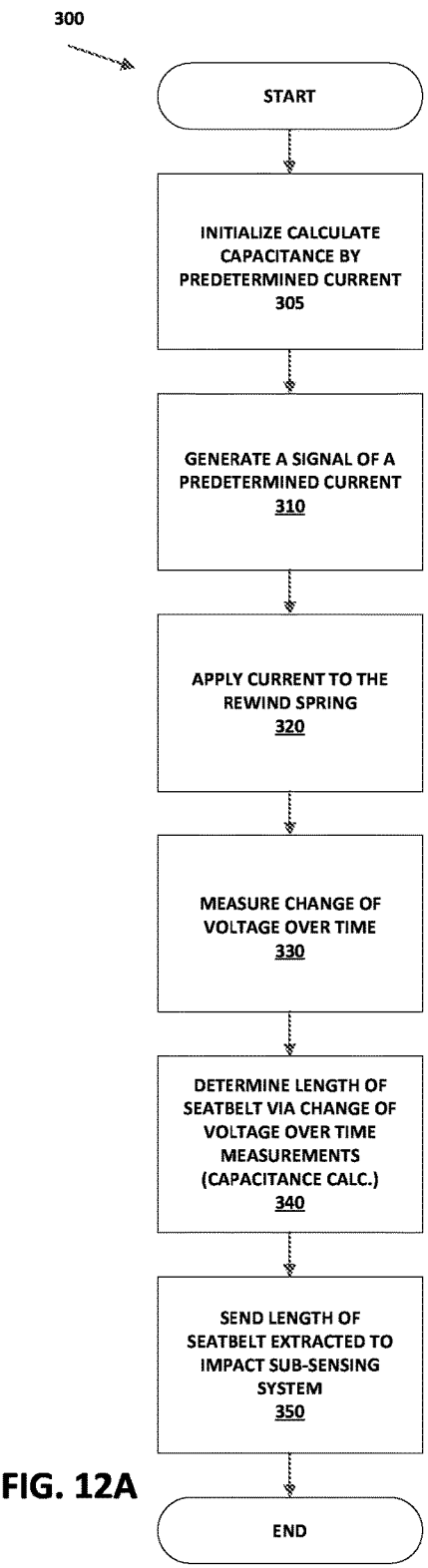
FIG. 12A is a flowchart of a capacitive measurement technique using a predetermined current.

FIG. 12A is a flowchart illustrating an exemplary process 300 including an alternative technique to calculate the capacitance using a predetermined current in a block 305. A signal is then generated with a predetermined current in a block 310 and applied to the flexible parallel plate capacitor in a block 320. Next, voltages are measured over a time period in a block 330 and the length of the seatbelt paid out is calculated in a block 340. The predetermined time period is selected using the predetermined current value and an estimate of the capacitance value. The calculated length is then sent to the impact sensing sub-system in a block 350.

Figure 12B:
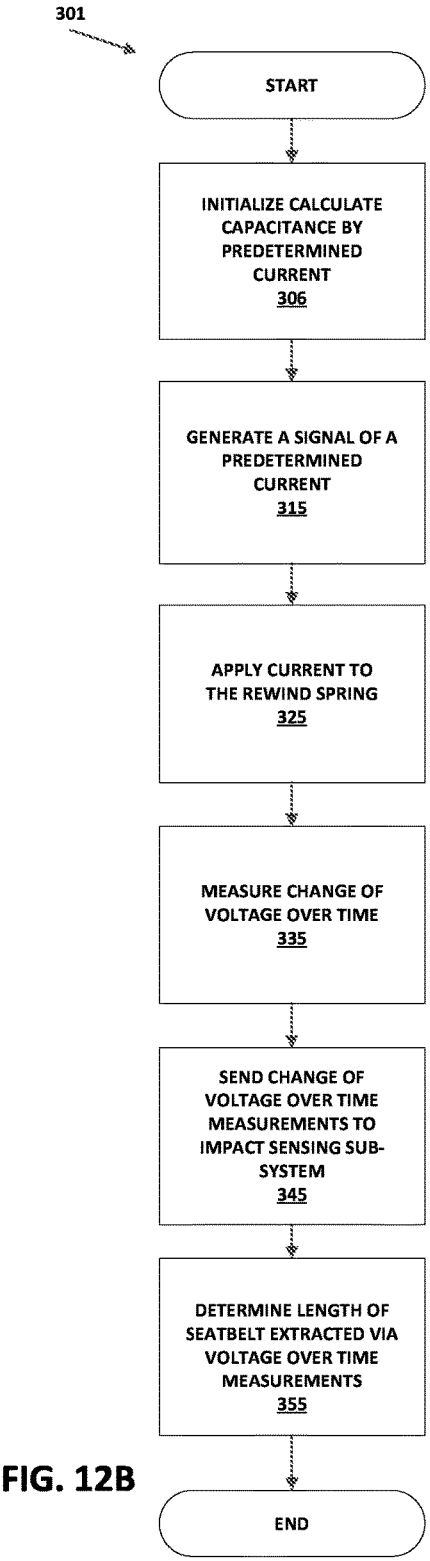
FIG. 12B is a flowchart of a capacitive measurement technique using a predetermined current in a controller.

In an alternative embodiment, the voltage over time measurements can be sent directly to the to the impact sensing sub-system 118. FIG. 12B is a flowchart illustrating an exemplary process 301 to calculate the capacitance using a predetermined current in a block 306. A signal is then generated with a predetermined current in a block 315 and applied to the flexible parallel plate capacitor in a block 325. Next, voltages are measured over a time period in a block 335 and the measurements are sent to the impact sensing sub-system 118 in a block 345. The predetermined time period is selected using the predetermined current value and an estimate of the capacitance value. The length is then calculated by the impact sensing sub-system 118 in a block 355.

Other objects, advantages and salient features of the invention will become apparent to those skilled in the art from the following claims.

What is claimed is:

1. A system, comprising:
   a rewind spring, attachable to a seatbelt, joined to an electrolytic coil to form a capacitor;
   a capacitive measuring device connected to the capacitor;
   a processor programmed to trigger a pre-tensioner located in a seatbelt assembly based on payout of the seatbelt determined from measured capacitance from the measuring device.

2. The system of claim 1, wherein the processor is further programmed to trigger the pre-tensioner only upon a determination of an impact.

3. The system of claim 1, further comprising, in the capacitive measuring device, a second processor programmed to measure the capacitance.

4. The system of claim 1, wherein the rewind spring has a first end connected to a center spool and a second end connected to a rewind spring housing.

5. The system of claim 4, further comprising a dielectric material having a first side adjacent to the rewind spring.

6. The system of claim 4, wherein the electrolytic coil has first and second sides that are each adjacent to the dielectric material such that the rewind spring is electrically isolated from the electrolytic coil.

7. The system of claim 1, wherein the capacitive measuring device has a first lead connected to the first end of the rewind spring and a second lead connected to a first end of the electrolytic coil.

8. The system of claim 2, further comprising at least one impact sensor, including one of an accelerometer, a radar device, a lidar device and a vision system.

9. The system of claim 1, wherein the electrolytic coil and the rewind spring are made of a same material.

10. The system of claim 1, wherein the electrolytic coil is made of aluminum, copper, or a malleable metal in the form of a flexible thin film or foil.

11. The system of claim 1, wherein the electrolytic coil is a metalized coating on a dielectric plastic film.

12. The system of claim 1, wherein a dielectric material and the electrolytic coil are combined to form a dielectric electrolytic layer.

13. The system of claim 1, wherein the electrolytic coil has a length and width that are shorter than or roughly equal to the respective length and width of the rewind spring.

14. The system of claim 4, wherein a first end of the electrolytic coil is closer to an outer periphery of the rewind spring housing than to the center spool in the rewind spring housing.

15. The system of claim 4, wherein the first end of the electrolytic coil is closer to a center spool in the rewind spring housing than to the outer periphery of the rewind spring housing.

16. The system of claim 5, wherein the dielectric material includes one of Teflon, mylar, polyvinyl chloride (PVC), polypropylene (PP), polyethylene naphthalate (PEN), polyethylene terephthalate (PET) or any other suitable dielectric material.

* * * * *